US012671311B2

(12) United States Patent (10) Patent No.: US 12,671,311 B2
Peng et al. (45) Date of Patent: Jun. 30, 2026

(54) THREE-PHASE RESONANT CONVERTER AND METHOD OF CONTROLLING THE SAME

(71) Applicant: DELTA ELECTRONICS, INC., Taoyuan City (TW)

(72) Inventors: Te-Chih Peng, Taoyuan City (TW); Chao-Fong Chang, Taoyuan City (TW); Ming-Hsiang Lo, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 283 days.

(21) Appl. No.: 18/474,556

(22) Filed: Sep. 26, 2023

(65) Prior Publication Data

US 2025/0030338 A1 Jan. 23, 2025

(30) Foreign Application Priority Data

Jul. 17, 2023 (CN) ......................... 202310872970.X

(51) Int. Cl.
H02M 1/00 (2006.01)
H02M 3/00 (2006.01)
H02M 3/335 (2006.01)
(52) U.S. Cl.
CPC ........... H02M 1/0043 (2021.05); H02M 3/01 (2021.05); H02M 3/33561 (2013.01); H02M 3/33569 (2013.01); H02M 3/33576 (2013.01)
(58) Field of Classification Search
CPC ...... H02M 1/0043; H02M 3/01; H02M 3/335; H02M 3/33569; H02M 3/33573; H02M 3/33576; H02M 3/33584; H02M 3/33592
See application file for complete search history.

(56) References Cited

U.S. PATENT DOCUMENTS 5,027,264 A * 6/1991 DeDoncker ....... H02M 3/33584
363/27
6,067,237 A * 5/2000 Nguyen ............ H02M 3/33584
363/41

(Continued)

FOREIGN PATENT DOCUMENTS

CN 103683964 A 3/2014
CN 102468764 B 12/2015

(Continued)

OTHER PUBLICATIONS

Office Action dated Jun. 25, 2024 of the corresponding Taiwan patent application No. 112126539.

(Continued)

*Primary Examiner* — Gary L Laxton
(74) *Attorney, Agent, or Firm* — MUNCY, GEISSLER, OLDS & LOWE, P.C.

(57) ABSTRACT

A three-phase resonant converter includes a three-phase transformer, an input bridge arm assembly, an output bridge arm assembly, and a control unit. The input bridge arm assembly has three input switch arms, and each input switch arm has an upper switch and a lower switch. The output bridge arm assembly has three output synchronous rectification switch arms respectively coupled to the three secondary-side windings. Each output synchronous rectification switch arm has an upper rectification switch and a lower rectification switch. The control of each output synchronous rectification switch arm is corresponding to the control of each input switch arm. The control unit controls the upper rectification switch or the lower rectification switch to be turned on with a leading phase angle to the corresponding upper switch or the lower switch so as to maintain an output voltage of the resonant converter to be higher than a voltage threshold.

18 Claims, 10 Drawing Sheets

(56) References Cited

U.S. PATENT DOCUMENTS

| | | | | |
|---|---|---|---|---|
| 2015/0146455 A1* | 5/2015 | Engel | ................ | H02M 3/33507 |
| | | | | 363/17 |
| 2015/0180350 A1 | 6/2015 | Huang et al. | | |
| 2020/0274443 A1* | 8/2020 | Itogawa | ............ | H02M 3/33573 |
| 2022/0014099 A1 | 1/2022 | Kim et al. | | |
| 2022/0140738 A1 | 5/2022 | Lin et al. | | |
| 2022/0416677 A1 | 12/2022 | Yang et al. | | |

FOREIGN PATENT DOCUMENTS

| | | | |
|---|---|---|---|
| CN | 111064370 A | 4/2020 |
| CN | 115528918 A | 12/2022 |
| CN | 116365852 A | 6/2023 |
| DE | 102012204035 A1 | 9/2013 |
| TW | 202220357 A | 5/2022 |

OTHER PUBLICATIONS

Yadong Wang et al: "Performance Analysis and Design for Three-phase Y-Y Fixed-Frequency Bidirectional CLLC Resonant Converter with Synchronous PWM Modulation", 2023 IEEE 6th International Electrical and Energy Conference (CIEEC), IEEE, May 12, 2023, pp. 2278-2283; Figs. 1, 2, 5, 7; Section II, V.

Suk-Ho Ahn et al: "High-Efficiency Bidirectional Three-Phase LCC Resonant Converter with a Wide Load Range", IEEE Transactions on Power Electronics, Institute of Electrical and Electronics Engineers, USA, vol. 34, No. 1, Jan. 1, 2019, pp. 97-105; Figs. 1-3, 15, 22.

Zhan Wang et al: "Three-phase bidirectional DC-DC converter with enhanced current sharing capability", Energy Conversion Congress and Exposition (ECCE), 2010 IEEE, IEEE, Piscataway, NJ, USA, Sep. 12, 2010, pp. 1116-1122; Figs. 1, 5, 6.

Search Report dated Mar. 18, 2024 of the corresponding European patent application No. 23199691.9.

* cited by examiner

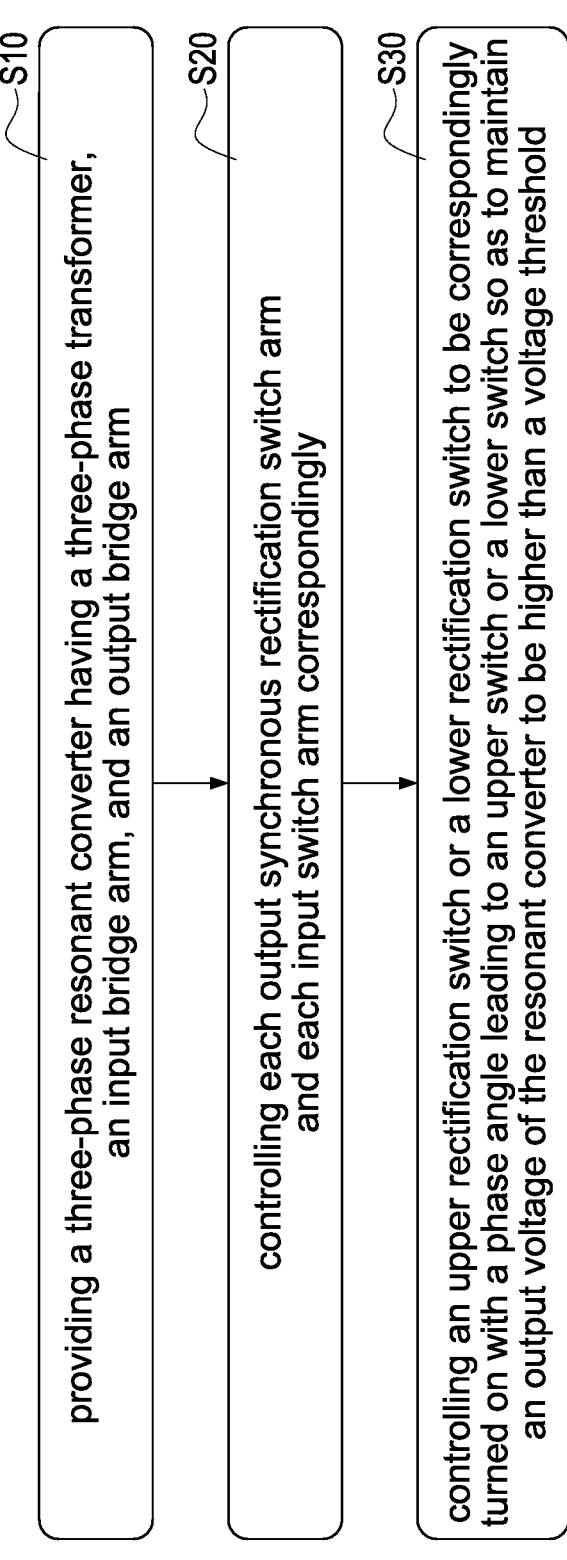

S10 providing a three-phase resonant converter having a three-phase transformer, an input bridge arm, and an output bridge arm S20 controlling each output synchronous rectification switch arm and each input switch arm correspondingly S30 controlling an upper rectification switch or a lower rectification switch to be correspondingly turned on with a phase angle leading to an upper switch or a lower switch so as to maintain an output voltage of the resonant converter to be higher than a voltage threshold

FIG.8

THREE-PHASE RESONANT CONVERTER AND METHOD OF CONTROLLING THE SAME

BACKGROUND

Technical Field

The present disclosure relates to a resonant converter and a method of controlling the same, and more particularly to a three-phase resonant converter and a method of controlling the same.

Description of Related Art

The statements in this section merely provide background information related to the present disclosure and do not necessarily constitute prior art.

Due to soft-switching characteristics, the resonant converter has better conversion efficiency than the traditional DC-to-DC converter, and therefore the resonant converter has been widely used in various power supply products in recent years, among which the LLC structure is more common. However, the resonant converter has the characteristic that high gain and high efficiency cannot be satisfied at the same time: if the characteristic curve is optimized for high efficiency, the gain capability will be sacrificed, resulting in the inability to meet the current market requirement that the output voltage of the power converter needs to be maintained at a certain output level (referred to as the voltage threshold in the following) for a hold-up time when the input power is lost. Conversely, if optimized for a high gain curve, the efficiency will be sacrificed for increased energy consumption.

Existing control strategies have been successfully applied to single-phase resonant converters. However, with the gradual development of power supply products to higher output power, the application of single-phase resonant converters began to appear inadequate. In order to achieve three-phase current balance in three-phase resonant converters, a common method used in the past was to independently adjust the duty cycle of the three phases. However, this method cannot make the duty cycle of the three phases operate at the optimum point, thereby affecting efficiency. Another common method is to adjust the relative angles of the three-phase duty cycle so that the three phases are not fixed at 120 degrees from each other so as to achieve current balance, but the control difficulty of this method is relatively high.

Therefore, how to design a three-phase resonant converter and a method of controlling the same to solve the problems and technical bottlenecks in the existing technology has become a critical topic in this field.

SUMMARY

An objective of the preset disclosure is to provide a three-phase resonant converter. The three-phase resonant converter includes a three-phase transformer, an input bridge arm assembly, an output bridge arm assembly, and a control unit. The three-phase transformer includes three primary-side windings and three secondary-side windings. The input bridge arm assembly includes three input switch arms respectively coupled to the three primary-side windings, wherein each input switch arm includes an upper switch and a lower switch. The output bridge arm assembly includes three output synchronous rectification switch arms respectively coupled to the three secondary-side windings, wherein each output synchronous rectification switch arm includes an upper rectification switch and a lower rectification switch, and the control of each output synchronous rectification switch arm is corresponding to the control of each input switch arm. The control unit controls the upper rectification switch or the lower rectification switch to be correspondingly turned on with a phase angle leading to the upper switch or the lower switch so as to maintain an output voltage of the resonant converter to be higher than a voltage threshold.

Accordingly, the three-phase resonant converter has the following characteristics and advantages: 1. the three-phase resonant converter and the method of controlling the same can provide both high-gain and high-efficiency characteristics, and can be applied to higher output power design; 2. the unbalanced input currents can be controlled to adjust the phase angle differences for the first phase angle, the second phase angle, and the third phase angle so as to achieve the optimum control of leading phase angle and the balance of the three-phase current; 3. three primary-side windings and three secondary-side windings of the three-phase transformer can be implemented in a star connection (Y connection) or a delta connection (Δ connection), thereby increasing the flexibility and convenience of circuit design.

Another objective of the preset disclosure is to provide a method of controlling a three-phase resonant converter. The method includes steps of: providing a three-phase resonant converter having a three-phase transformer, an input bridge arm, and an output bridge arm; wherein the input bridge arm assembly includes three input switch arms, and each input switch arm includes an upper switch and a lower; wherein the output bridge arm assembly includes three output synchronous rectification switch arms, and each output synchronous rectification switch arm includes an upper rectification switch and a lower rectification switch, controlling each output synchronous rectification switch arm and each input switch arm correspondingly, and control the upper rectification switch or the lower rectification switch to be correspondingly turned on with a phase angle leading to the upper switch or the lower switch so as to maintain an output voltage of the resonant converter to be higher than a voltage threshold.

Accordingly, the method of controlling the three-phase resonant converter has the following characteristics and advantages: 1. the three-phase resonant converter and the method of controlling the same can provide both high-gain and high-efficiency characteristics, and can be applied to higher output power design; 2. the unbalanced input currents can be controlled to adjust the phase angle differences for the first phase angle, the second phase angle, and the third phase angle so as to achieve the optimum control of leading phase angle and the balance of the three-phase current; 3. three primary-side windings and three secondary-side windings of the three-phase transformer can be implemented in a star connection (Y connection) or a delta connection (Δ connection), thereby increasing the flexibility and convenience of circuit design.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows:

FIG. 8 is a flowchart of a method of controlling the three-phase resonant converter according to the present disclosure.

DETAILED DESCRIPTION

Figure 1:
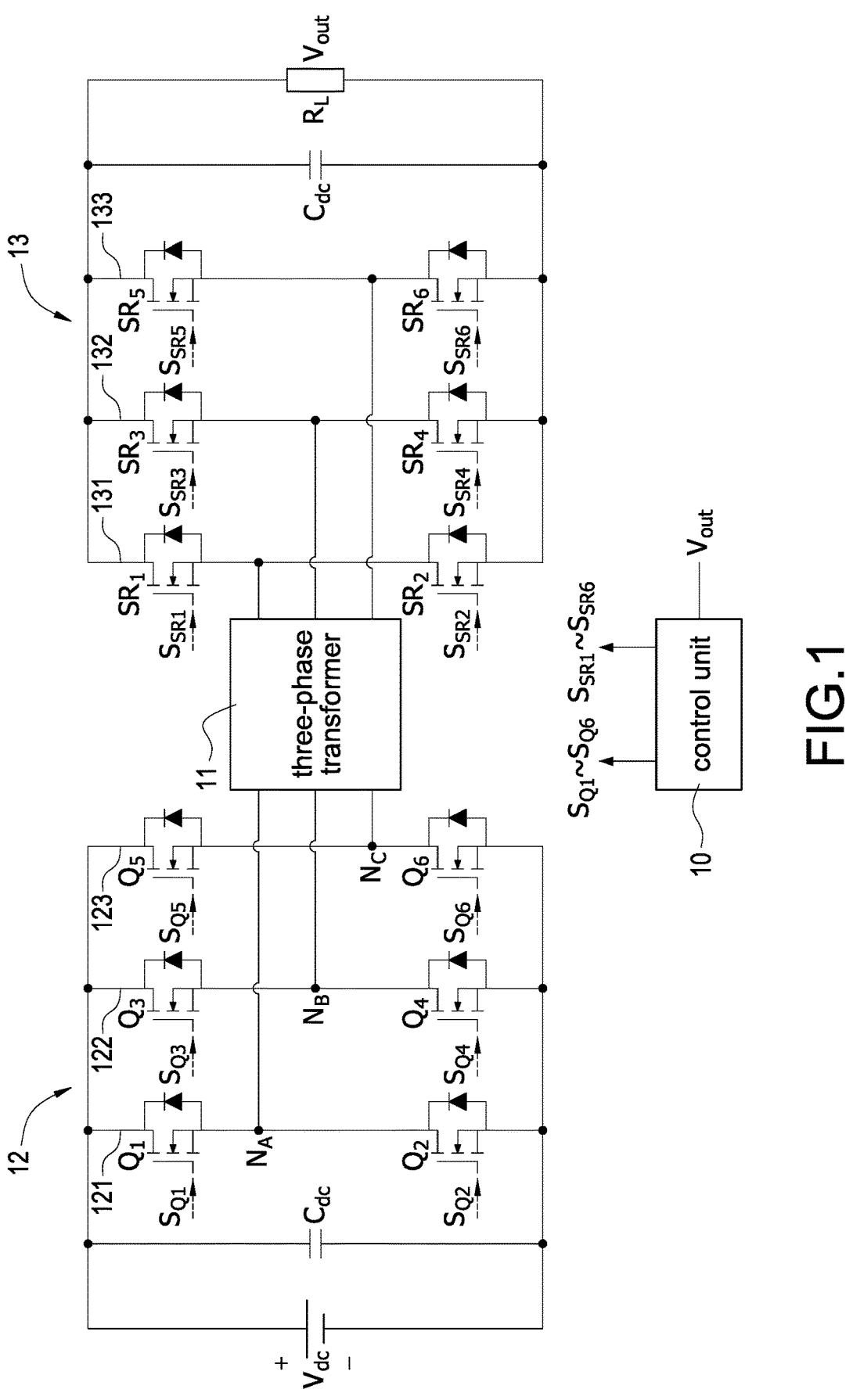
FIG. 1 is a block circuit diagram of a three-phase resonant converter according to the present disclosure.

Reference will now be made to the drawing figures to describe the present disclosure in detail. It will be understood that the drawing figures and exemplified embodiments of present disclosure are not limited to the details thereof.

Figure 7B:
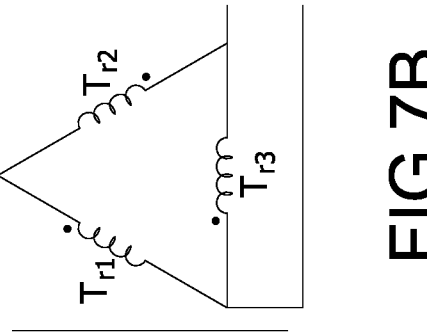
FIG. 7A and FIG. 7B are circuit diagrams of three secondary-side windings of the three-phase transformer according to different embodiments of the present disclosure.
Figure 7A:
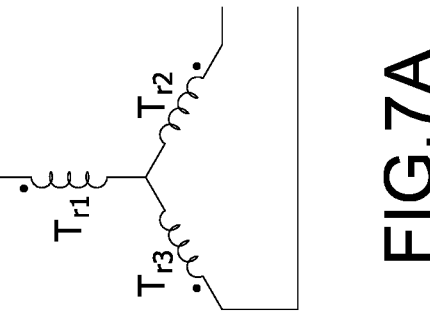

Please refer to FIG. 1, which shows a block circuit diagram of a three-phase resonant converter according to the present disclosure. The three-phase resonant converter includes a three-phase transformer 11, an input bridge arm assembly 12, an output bridge arm assembly 13, and a control unit 10. The three-phase transformer 11 includes a resonant circuit (having resonant capacitors Cr1-Cr3 and resonant inductors Lr1-Lr3), and three primary-side windings and three secondary-side windings. The control strategy proposed in the present disclosure may be applied to various three-phase resonant converter structures, and as shown in FIG. 6A to FIG. 6H, the three primary-side windings of the three-phase transformer 11 are star-connected (wye-connected) or delta-connected (triangle-connected), and as shown in FIG. 7A and FIG. 7B, the three secondary-side windings of the three-phase transformer 11 are star-connected or delta-connected.

The input bridge arm assembly 12 includes three input switch bridge arms 121, 122, 123, i.e., a first input switch bridge arm 121, a second input switch bridge arm 122, and a three input switch bride arm 123, respectively coupled to the three primary-side windings. Each input switch bridge arm 121, 122, 123 includes an upper switch $Q_1$, $Q_3$, $Q_5$ and a lower switch $Q_2$, $Q_4$, $Q_6$, that is, the first input switch bridge arm 121 includes a first upper switch $Q_1$ and a first lower switch $Q_2$, and the first upper switch $Q_1$ and the first lower switch $Q_2$ are commonly connected at a first node $N_A$. The second input switch bridge arm 122 includes a second upper switch $Q_3$ and a second lower switch $Q_4$, and the second upper switch $Q_3$ and the second lower switch $Q_4$ are commonly connected at a second node NB. The third input switch bridge arm 123 includes a third upper switch $Q_5$ and a third lower switch $Q_6$, and the third upper switch $Q_5$ and the third lower switch $Q_6$ are commonly connected at a third node $N_C$.

The output bridge arm assembly includes three output synchronous rectification switch arms 131, 132, 133, i.e., a first output synchronous rectification switch arm 131, a second output synchronous rectification switch arm 132, and a three output synchronous rectification switch arm 133, respectively coupled to the three secondary-side windings. Each output synchronous rectification switch arm 131, 132, 133 includes an upper rectification switch $SR_1$, $SR_3$, $SR_5$ and a lower rectification switch $SR_2$, $SR_4$, $SR_6$, that is, the first output synchronous rectification switch arm 131 includes a first upper rectification switch $SR_1$ and a first lower rectification switch $SR_2$. The second output synchronous rectification switch arm 132 includes a second upper rectification switch $SR_3$ and a second lower rectification switch $SR_4$. The third output synchronous rectification switch arm 133 includes a third upper rectification switch $SR_5$ and a third lower rectification switch $SR_6$.

In particular, the control of each output synchronous rectification switch arm 131, 132, 133 is corresponding to the control of each input switch arm 121, 122, 123. Specifically, the control of the first upper rectification switch $SR_1$ and the first lower rectification switch $SR_2$ of the first output synchronous rectification switch arm 131 is corresponding to the first upper switch $Q_1$ and the first lower switch $Q_2$ of the first input switch bridge arm 121. The control of the second upper rectification switch $SR_3$ and the second lower rectification switch $SR_4$ of the second output synchronous rectification switch arm 132 is corresponding to the second upper switch $Q_3$ and the second lower switch $Q_4$ of the second input switch bridge arm 122. The control of the third upper rectification switch $SR_5$ and the third lower rectification switch $SR_6$ of the third output synchronous rectification switch arm 133 is corresponding to the third upper switch $Q_5$ and the third lower switch $Q_6$ of the third input switch bridge arm 123.

In different embodiments, the controller unit 10 may receive an input voltage Vdc or the output voltage Vout of the three-phase resonant converter, that is, as long as the state of the output voltage Vout can be directly or indirectly acquired, it can be a source of voltage information. Taking the embodiment of receiving the output voltage Vout in FIG. 1 as an example, the control unit 10 provides input bridge arm switch signals $S_{Q1}$-$S_{Q6}$ to respectively control the upper switches $Q_1$, $Q_3$, $Q_5$ and the lower switches $Q_2$, $Q_4$, $Q_6$ and provides output bridge arm switch signals $S_{SR1}$-$S_{SR6}$ to respectively control the upper rectification switches $SR_1$, $SR_3$, $SR_5$ and the lower rectification switches $SR_2$, $SR_4$, $SR_6$ according to the output voltage Vout so that the upper rectification switch $SR_1$, $SR_3$, $SR_5$ or the lower rectification switch $SR_2$, $SR_4$, $SR_6$ to be correspondingly turned on with a phase angle leading to the upper switch $Q_1$, $Q_3$, $Q_5$ or the lower switch $Q_2$, $Q_4$, $Q_6$ so as to maintain the output voltage Vout of the resonant converter to be higher than a voltage threshold. Accordingly, when the three-phase resonant converter is shut down or the input power source does not supply power, the hold-tup time for the output voltage Vout to be kept at the output level can be extended. The detailed operation and principle will be explained later.

Figure 2A:
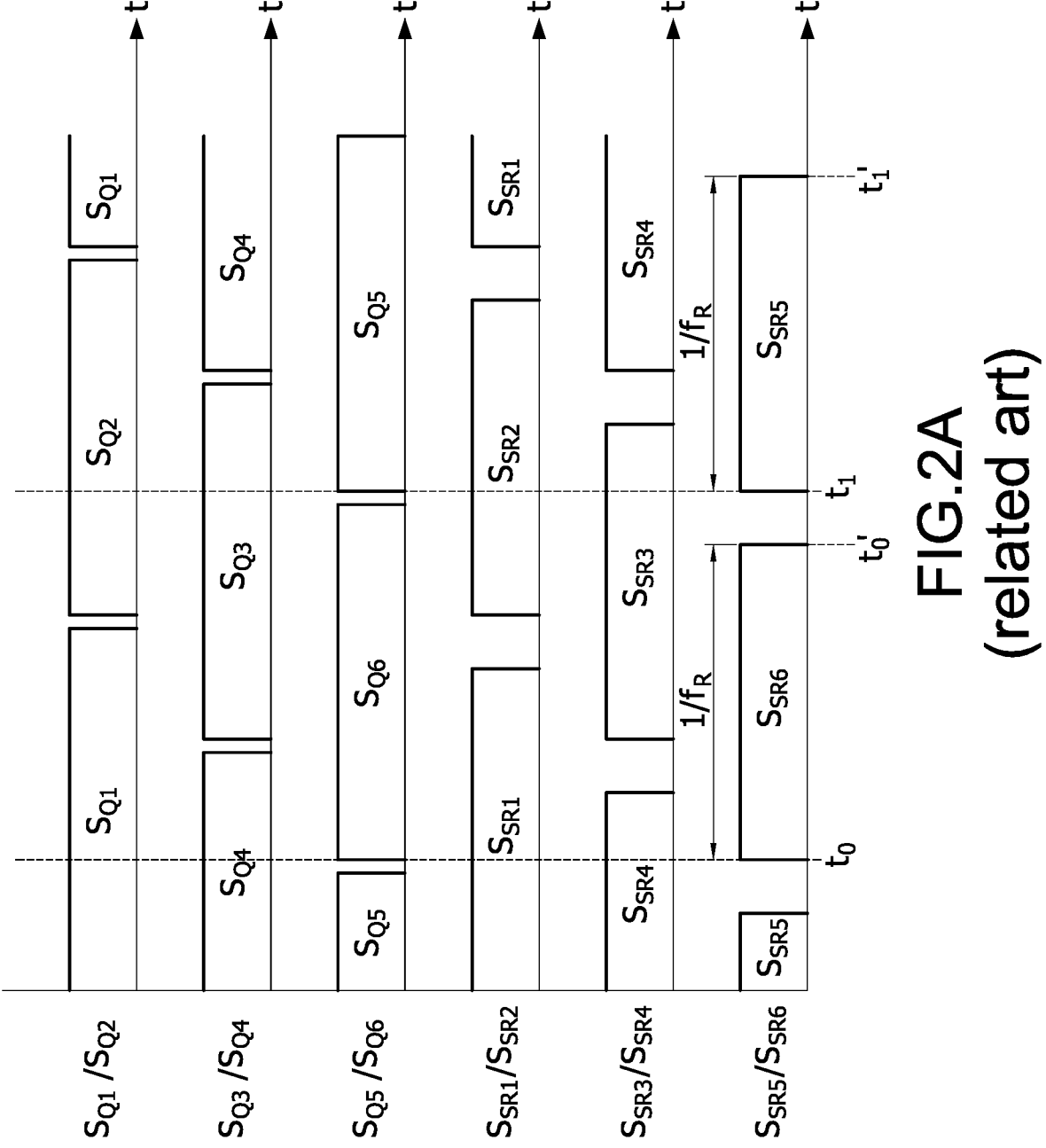
FIG. 2A is a schematic waveform of switch signals of operating a conventional three-phase resonant converter at a frequency being less than a frequency threshold.
Figure 2B:
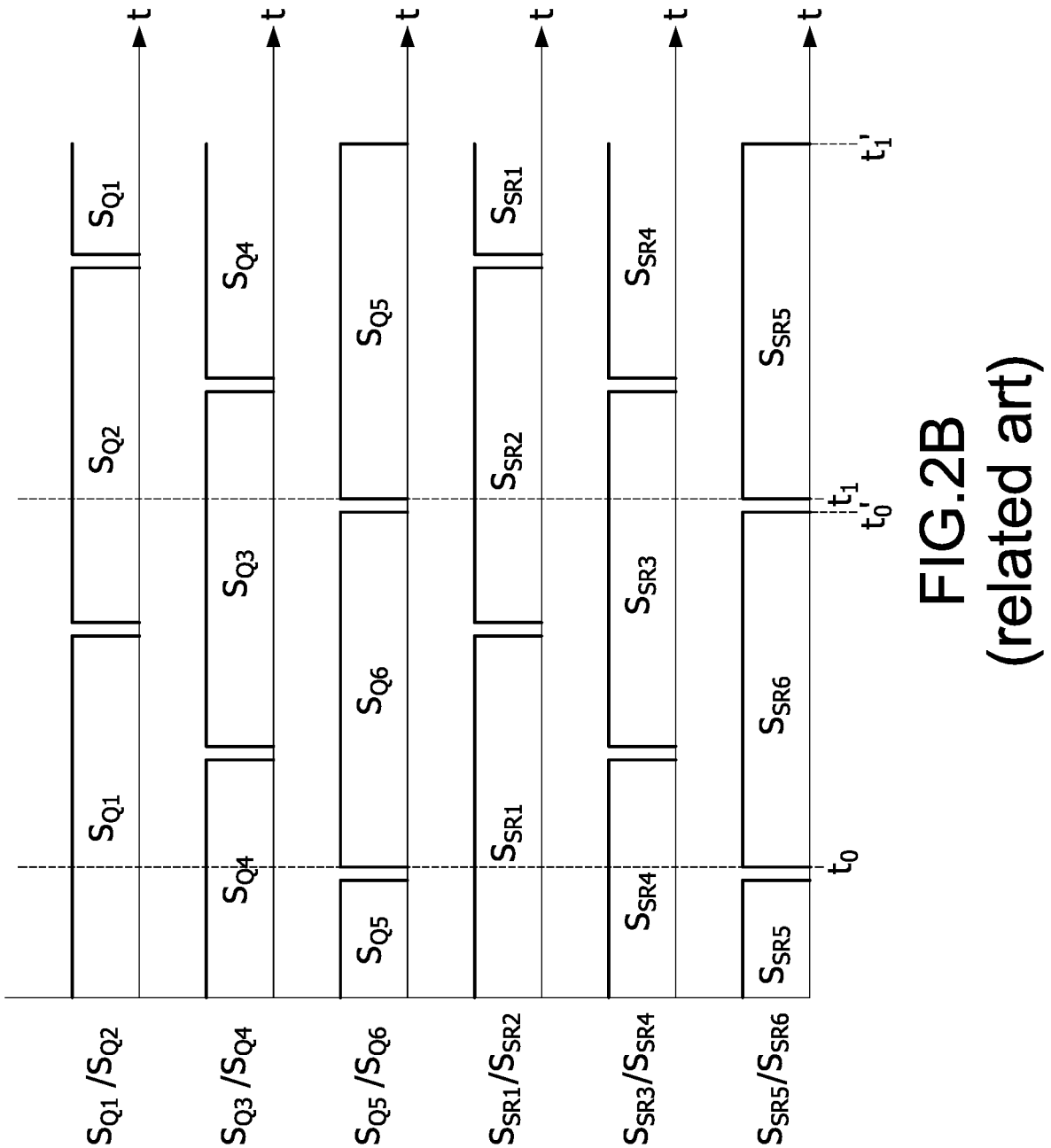
FIG. 2B is a schematic waveform of switch signals of operating the conventional three-phase resonant converter at a frequency being greater than the frequency threshold.

Please refer to FIG. 2A and FIG. 2B, which respectively show schematic waveforms of switch signals of operating a conventional three-phase resonant converter at a frequency being less than a frequency threshold and at the frequency being greater than the frequency threshold. As shown in FIG. 2A, when the resonant converter operates at the frequency being less than the frequency threshold, such as but not limited to, a resonant frequency of the resonant converter, and the resonant frequency will be described later as examples, in order to avoid the hard switching of the synchronous rectification switch on the output side, resulting in increased switching loss, the turned-on time period is reduced. For example, a time period of turning on the third lower rectification switch $SR_6$ shown in the figures is the resonant period $1/f_R$. However, it will reduce the hold-up time that the power supply can maintain the output voltage at a certain/specific output level when the power supply is turned off or the input power source does not supply power. The resonant converter operating above the resonant frequency (as shown in FIG. 2B) is less likely to have this situation than the resonant converter operating below the resonant frequency.

Therefore, in order to solve the situation that the switching mode and the hold-up time of the switches cannot be considered in the previous disclosure, the present disclosure provides a three-phase resonant converter and a method of controlling the same to solve the existing problems and technical bottlenecks in the related art.

Figure 3A:
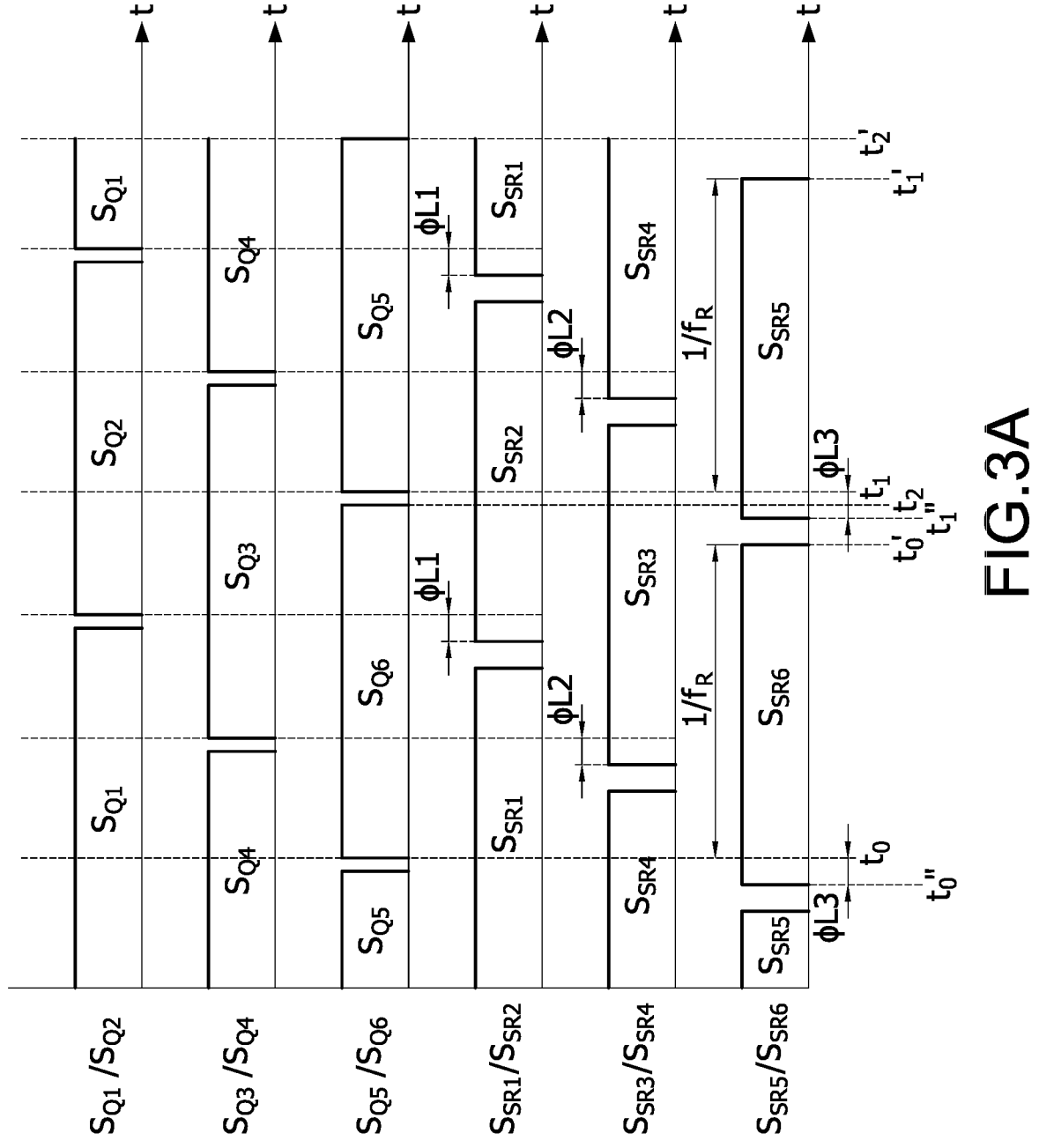
FIG. 3A is a schematic waveform of switch signals of operating the three-phase resonant converter at a frequency being less than the frequency threshold according to the present disclosure.

Please refer to FIG. 3A, which shows a schematic waveform of switch signals of operating the three-phase resonant converter at a frequency being less than the frequency threshold according to the present disclosure. The control unit 10 acquires a working frequency command according to the output voltage Vout of the three-phase resonant converter. Based on the working frequency command being less than the frequency threshold (for example, the resonant frequency $f_R$) of the resonant converter, the upper rectification switch $SR_1$, $SR_3$, $SR_5$ or the lower rectification switch $SR_2$, $SR_4$, $SR_6$ is correspondingly turned on with a phase angle leading to the upper switch $Q_1$, $Q_3$, $Q_5$ or the lower switch $Q_2$, $Q_4$, $Q_6$. That is, the first upper rectification switch $SR_1$ is turned on with a first phase angle $\Phi L1$ leading to the first upper switch $Q_1$, or the first lower rectification switch $SR_2$ is turned on with the first phase angle $\Phi L1$ leading to the first lower switch $Q_2$. Similarly, the second upper rectification switch $SR_3$ is turned on with a second phase angle $\Phi L2$ leading to the second upper switch $Q_3$, or the second lower rectification switch $SR_4$ is turned on with the second phase angle $\Phi L2$ leading to the second lower switch $Q_4$. Similarly, the third upper rectification switch $SR_5$ is turned on with a third phase angle $\Phi L3$ leading to the third upper switch $Q_5$, or the third lower rectification switch $SR_6$ is turned on with the third phase angle $\Phi L3$ leading to the third lower switch $Q_6$.

In this operation, since the upper rectification switch $SR_1$, $SR_3$, $SR_5$ or the lower rectification switch $SR_2$, $SR_4$, $SR_6$ is correspondingly turned on with the phase angle leading to the upper switch $Q_1$, $Q_3$, $Q_5$ or the lower switch $Q_2$, $Q_4$, $Q_6$, compared to the FIG. 2A (the time period of turning on the rectification switch $SR_6$ is the resonant period $1/f_R$), the turned-on time period is greater than the resonant period $1/f_R$, wherein the resonant period $1/f_R$ is the reciprocal of the resonant frequency $f_R$.

Moreover, as shown in FIG. 3A, a time point of turning on the upper rectification switch $SR_1$, $SR_3$, $SR_5$ or turning on the lower rectification switch $SR_2$, $SR_4$, $SR_6$ is earlier than a time point of turning on the corresponding upper switch $Q_1$, $Q_3$, $Q_5$ or lower switch $Q_2$, $Q_4$, $Q_6$; a time point of turning off the upper rectification switch $SR_1$, $SR_3$, $SR_5$ or turning off the lower rectification switch $SR_2$, $SR_4$, $SR_6$ is earlier than a time point of turning off the corresponding upper switch $Q_1$, $Q_3$, $Q_5$ or lower switch $Q_2$, $Q_4$, $Q_6$, and the time period of turning on the upper rectification switch $SR_1$, $SR_3$, $SR_5$ or turning on the lower rectification switch $SR_2$, $SR_4$, $SR_6$ at different switching cycles gradually increases with time. Specifically, taking the third lower rectification switch $SR_6$ and the third lower switch $Q_6$ as an example. A time point (time $t0''$) of turning on the third lower rectification switch $SR_6$ is earlier than a time point (time $t0$) of turning on the three lower switch $Q_6$, and a time point (time $t0'$) of turning off the third lower rectification switch $SR_6$ is earlier than a time point (time $t2$) of turning off the third lower switch $Q_6$. The same is true for other upper and lower rectification switches and the corresponding upper and lower switches.

Figure 3B:
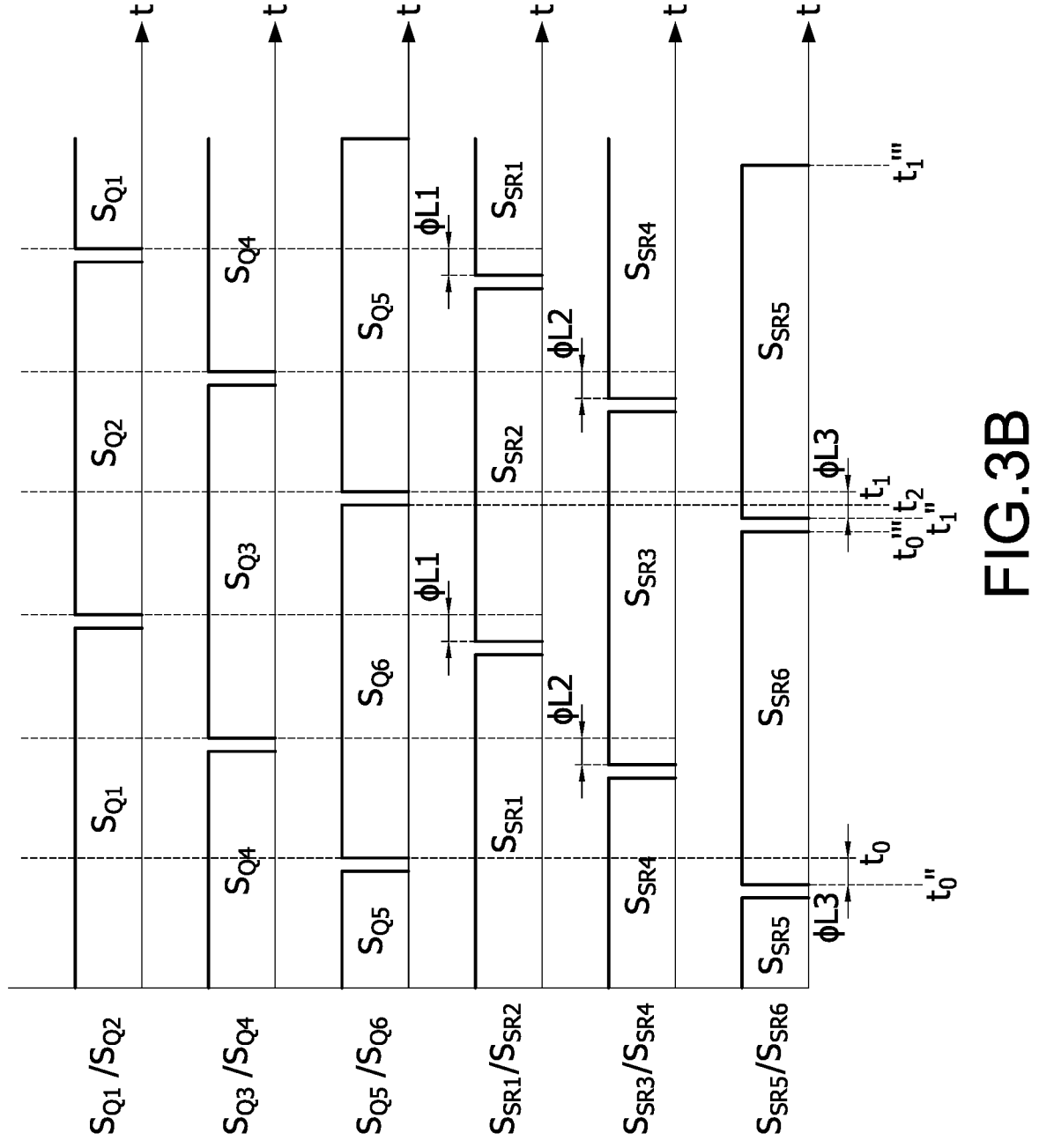
FIG. 3B is a schematic waveform of switch signals of operating the three-phase resonant converter at a frequency being greater than the frequency threshold according to the present disclosure.

Please refer to FIG. 3B, which shows a schematic waveform of switch signals of operating the three-phase resonant converter at a frequency being greater than the frequency threshold according to the present disclosure. The control unit 10 acquires the working frequency command according to the output voltage Vout of the three-phase resonant converter. Based on the working frequency command being greater than the frequency threshold (for example, the resonant frequency $f_R$) of the resonant converter, the upper rectification switch $SR_1$, $SR_3$, $SR_5$ or the lower rectification switch $SR_2$, $SR_4$, $SR_6$ is correspondingly turned on with a phase angle leading to the upper switch $Q_1$, $Q_3$, $Q_5$ or the lower switch $Q_2$, $Q_4$, $Q_6$. That is, the first upper rectification switch $SR_1$ is turned on with a first phase angle $\Phi L1$ leading to the first upper switch $Q_1$, or the first lower rectification switch $SR_2$ is turned on with the first phase angle $\Phi L1$ leading to the first lower switch $Q_2$. The same is true for other upper and lower rectification switches and the corresponding upper and lower switches.

Moreover, as shown in FIG. 3B, a time point of turning on the upper rectification switch $SR_1$, $SR_3$, $SR_5$ or turning on the lower rectification switch $SR_2$, $SR_4$, $SR_6$ is earlier than a time point of turning on the corresponding upper switch $Q_1$, $Q_3$, $Q_5$ or lower switch $Q_2$, $Q_4$, $Q_6$, and a time period of turning on the upper rectification switch $SR_1$, $SR_3$, $SR_5$ or turning on the lower rectification switch $SR_2$, $SR_4$, $SR_6$ is equal to a time period of turning on the corresponding upper switch $Q_1$, $Q_3$, $Q_5$ or lower switch $Q_2$, $Q_4$, $Q_6$. Specifically, taking the third lower rectification switch $SR_6$ and the third lower switch $Q_6$ as an example. A time point (time $t0''$) of turning on the third lower rectification switch $SR_6$ is earlier than a time point (time $t0$) of turning on the three lower switch $Q_6$, and a time period of turning on the third lower rectification switch $SR_6$ (from time $t0''$ to time $t0'''$) is equal to a time period of turning on the third lower switch $Q_6$ (from time $t0$ to time $t2$). The same is true for other upper and lower rectification switches and the corresponding upper and lower switches.

Figures 5A, 5B:
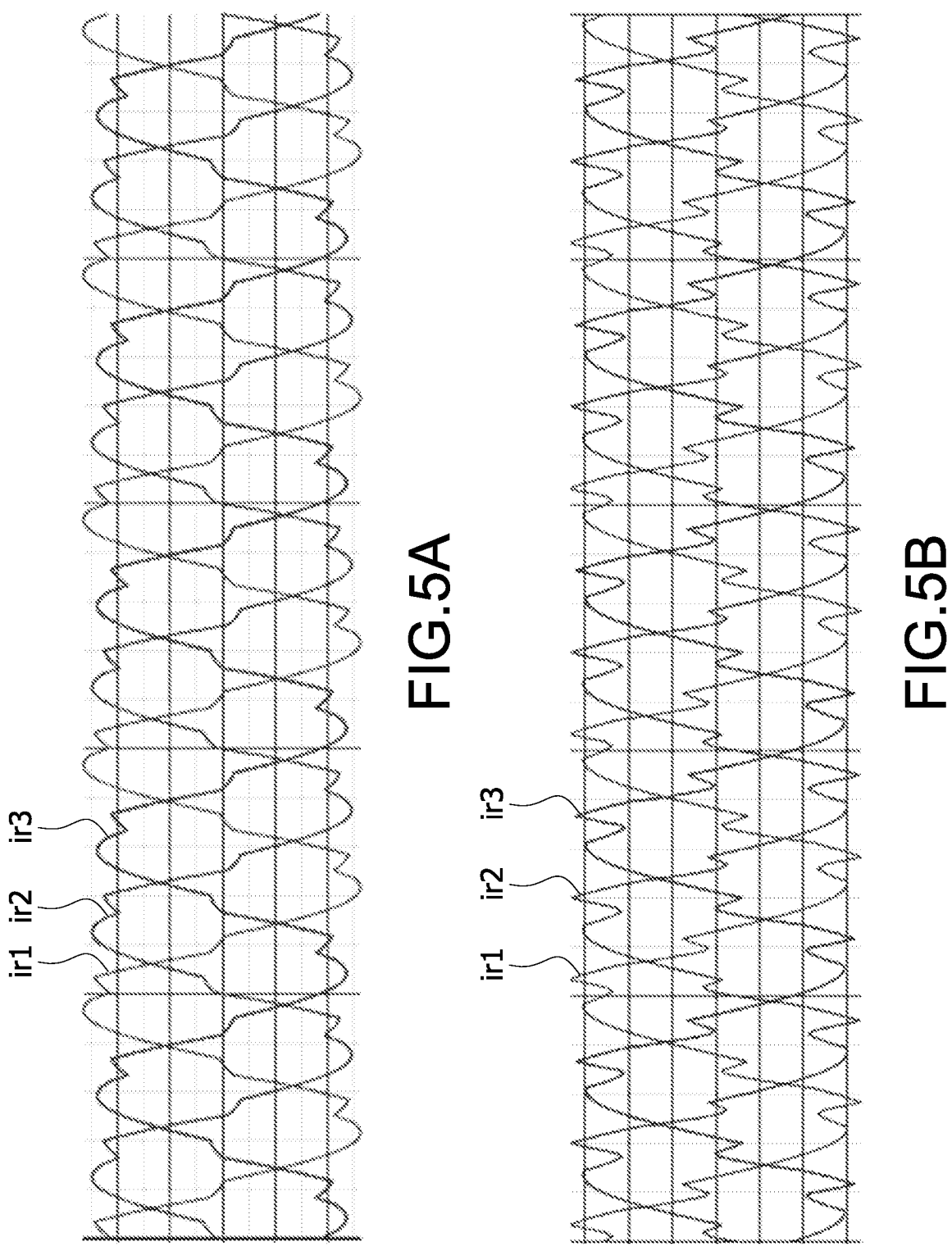
FIG. 5A is a schematic waveform of an unbalanced input current of the three-phase resonant converter of the present disclosure.
FIG. 5B is a schematic waveform of a balanced input current of the three-phase resonant converter of the present disclosure.
Figures 6A, 6B, 6C, 6D, 6E, 6F, 6G, 6H:
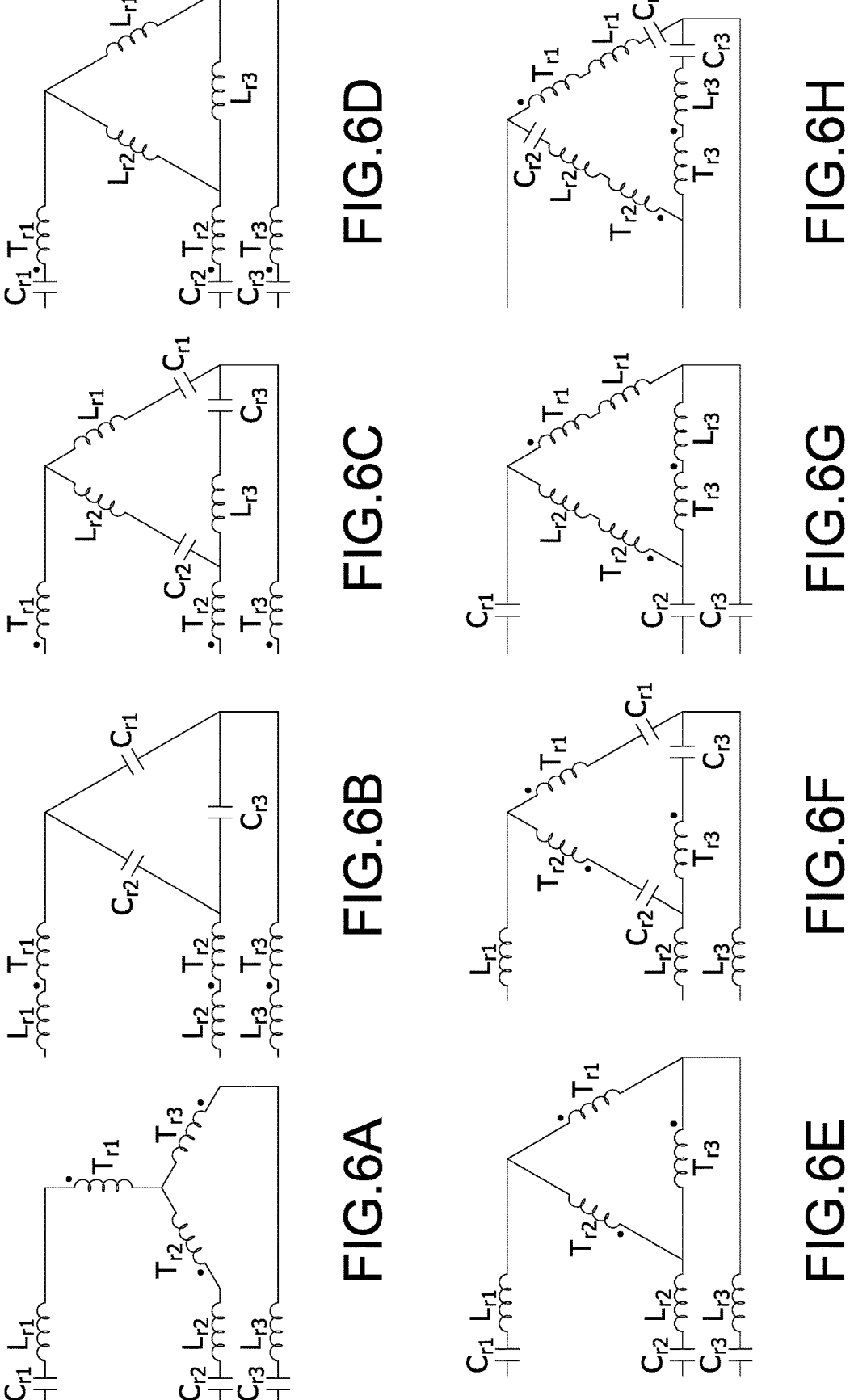
FIG. 6A to FIG. 6H are circuit diagrams of three primary-side windings of a three-phase transformer according to different embodiments of the present disclosure.

In one operation situation, based on three input currents flowing into the three primary-side windings being the same, that is, the input currents of the three-phase resonant converter are balanced (refer to FIG. 5B), the three phase angles which the three upper rectification switches $SR_1$, $SR_3$, $SR_5$ or the three lower rectification switches $SR_2$, $SR_4$, $SR_6$ are correspondingly turned on leading to the three upper switches $Q_1$, $Q_3$, $Q_5$ or the three lower switches $Q_2$, $Q_4$, $Q_6$ are the same. In another operation situation, based on three input currents flowing into the three primary-side windings being not the same, that is, the input currents of the three-phase resonant converter are not balanced (refer to FIG. 5A), the three phase angles which the three upper rectification switches $SR_1$, $SR_3$, $SR_5$ or the three lower rectification switches $SR_2$, $SR_4$, $SR_6$ are correspondingly turned on leading to the three upper switches $Q_1$, $Q_3$, $Q_5$ or the three lower switches $Q_2$, $Q_4$, $Q_6$ are not the same. The specific description of the above two operation situations is as follows.

Please refer to FIG. 3A and FIG. 3B, the first upper rectification switch $SR_1$ and the first lower rectification switch $SR_2$ are correspondingly turned on with a first phase angle $\Phi L1$ leading to the first upper switch $Q_1$ and the first lower switch $Q_2$. The second upper rectification switch $SR_3$ and the second lower rectification switch $SR_4$ are correspondingly turned on with a second phase angle $\Phi L2$ leading to the second upper switch $Q_3$ and the second lower switch $Q_4$. The third upper rectification switch $SR_5$ and the third lower rectification switch $SR_6$ are correspondingly turned on with a third phase angle $\Phi L3$ leading to the third upper switch $Q_5$ and the third lower switch $Q_6$. In particular, the relationships between the first phase angle $\Phi L1$, the second phase angle $\Phi L2$, and the third phase angle $\Phi L3$ are:

the second phase angle $\Phi L2$ is equal to the first phase angle $\Phi L1$ plus a first phase angle difference $\Delta \Phi L12$, that is, $\Phi L2 = \Phi L1 + \Delta \Phi L12$;

the third phase angle $\Phi L3$ is equal to the first phase angle $\Phi L1$ plus a second phase angle difference $\Delta \Phi L13$, that is, $\Phi L3 = \Phi L1 + \Delta \Phi L13$.

For the balanced-current operation situation of the three-phase resonant converter, since the first phase angle difference $\Delta \Phi L12$ and the second phase angle difference $\Delta \Phi L13$ are zero, the first phase angle $\Phi L1$, the second phase angle $\Phi L2$, and the third phase angle $\Phi L3$ are the same.

For the unbalanced-current operation situation of the three-phase resonant converter, since the first phase angle difference $\Delta \Phi L12$ and the second phase angle difference $\Delta \Phi L13$ are not zero, the first phase angle $\Phi L1$, the second phase angle $\Phi L2$, and the third phase angle $\Phi L3$ are not the same.

Moreover, the first phase angle difference $\Delta \Phi L12$ is determined by a first current Ir1 and a second current Ir2, and the second phase angle difference $\Delta \Phi L13$ is determined by the first current Ir1 and a third current Ir3. In particular, the first current Ir1 is a current flowing from a command node, i.e., a first node $N_A$ between the first upper switch $Q_1$ and the first lower switch $Q_2$ to the three-phase transformer 11, the second current Ir2 is a current flowing from a command node, i.e., a second node NB between the second upper switch $Q_3$ and the second lower switch $Q_4$ to the three-phase transformer 11, and the third current Ir3 is a current flowing from a command node, i.e., a third node $N_C$ between the third upper switch $Q_5$ and the third lower switch $Q_6$ to the three-phase transformer 11.

When the second current Ir2 is greater than the first current Ir1, the first phase angle difference $\Delta \Phi L12$ is negative, and when the second current Ir2 is less than the first current Ir1, the first phase angle difference $\Delta \Phi L12$ is positive. Moreover, an absolute value of a current difference between the second current Ir2 and the first current Ir1 is greater, an absolute value of the first phase angle difference $\Delta \Phi L12$ is greater. That is, when the second current Ir2 is increasingly greater than the first current Ir1, the first phase angle difference $\Delta \Phi L12$ is a decreasingly negative value, and when the second current Ir2 is decreasingly less than the first current Ir1, the first phase angle difference $\Delta \Phi L12$ is an increasingly positive value.

Similarly, when the third current Ir3 is greater than the first current Ir1, the second phase angle difference $\Delta \Phi L13$ is negative, and when the third current Ir3 is less than the first current Ir1, the second phase angle difference $\Delta \Phi L13$ is positive. Moreover, an absolute value of a current difference between the third current Ir3 and the first current Ir1 is greater, an absolute value of the second phase angle difference $\Delta \Phi L13$ is greater. That is, when the third current Ir3 is increasingly greater than the first current Ir1, the second phase angle difference $\Delta \Phi L13$ is a decreasingly negative value, and when the third current Ir3 is decreasingly less than the first current Ir1, the second phase angle difference $\Delta \Phi L13$ is an increasingly positive value.

Figure 4:
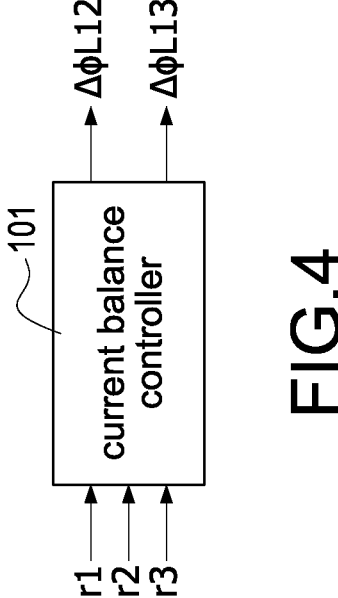
FIG. 4 is a block diagram of a current balance controller according to the present disclosure.

Please refer to FIG. 4, which shows a block diagram of a current balance controller according to the present disclosure. The three-phase resonant converter further includes a current balance controller 101. The current balance controller 101 receives the first current Ir1, the second current Ir2, and the third current Ir3, and calculates the first phase angle difference $\Delta \Phi L12$ and the second phase angle difference $\Delta \Phi L13$ according to peak values, average values, or root-mean-square values of the first current Ir1, the second current Ir2, and the third current Ir3.

Therefore, the unbalanced input currents are controlled by the current balance controller 101, and the phase angle differences are adjusted for the first phase angle $\Phi L1$, the second phase angle $\Phi L2$, and the third phase angle $\Phi L3$ so as to achieve the optimum control of leading phase angle.

Please refer to FIG. 8, which shows a flowchart of a method of controlling the three-phase resonant converter according to the present disclosure. Cooperating with the complete description and diagrams of the previously disclosed three-phase resonant converter, the method of controlling the resonant converter of the present disclosure includes steps as follows. First, providing a three-phase resonant converter having a three-phase transformer, an input bridge arm, and an output bridge arm (step S10), wherein the input bridge arm assembly includes three input switch arms 121, 122, 123, and each input switch arm 121, 122, 123 includes an upper switch $Q_1$, $Q_3$, $Q_5$ and a lower switch $Q_2$, $Q_4$, $Q_6$; wherein the output bridge arm assembly includes three output synchronous rectification switch arms 131, 132, 133, and each output synchronous rectification switch arm 131, 132, 133 includes an upper rectification switch $SR_1$, $SR_3$, $SR_5$ and a lower rectification switch $SR_2$, $SR_4$, $SR_6$. Afterward, controlling each output synchronous rectification switch arm 131, 132, 133 and each input switch arm 121, 122, 123 correspondingly (step S20). Finally, controlling the upper rectification switch $SR_1$, $SR_3$, $SR_5$ or the lower rectification switch $SR_2$, $SR_4$, $SR_6$ to be correspondingly turned on with a phase angle leading to the upper switch $Q_1$, $Q_3$, $Q_5$ or the lower switch $Q_2$, $Q_4$, $Q_6$ so as to maintain an output voltage of the resonant converter to be higher than a voltage threshold (step S30). As for the more complete circuit structure and control method of the three-phase resonant converter, please refer to the content of the previous disclosure, and the detail description is omitted here for conciseness.

In summary, the present disclosure has the following features and advantages:

1. The three-phase resonant converter and the method of controlling the same can provide both high-gain and high-efficiency characteristics, and can be applied to higher output power design.

2. The unbalanced input currents can be controlled to adjust the phase angle differences for the first phase angle, the second phase angle, and the third phase angle so as to achieve the optimum control of leading phase angle and the balance of the three-phase current.

3. Three primary-side windings and three secondary-side windings of the three-phase transformer can be implemented in a star connection (Y connection) or a delta connection (A connection), thereby increasing the flexibility and convenience of circuit design.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A three-phase resonant converter, comprising:
a three-phase transformer, comprising three primary-side windings and three secondary-side windings,
an input bridge arm assembly, comprising a first input switch arm, a second input switch arm, and a third input switch arms respectively coupled to the three primary-side windings, wherein the first input switch arm comprises a first upper switch and a first lower switch, the second input switch arm comprises a second upper switch and a second lower switch, and the third input switch arm comprises a third upper switch and a third lower switch, and
an output bridge arm assembly, comprising a first output synchronous rectification switch arm, a second output synchronous rectification switch arm, and a third output synchronous rectification switch arm respectively coupled to the three secondary-side windings, wherein the first output synchronous rectification switch arm comprises a first upper rectification switch and a first lower rectification switch, the second output synchronous rectification switch arm comprises a second upper rectification switch and a second lower rectification switch, and the third output synchronous rectification switch arm comprises a third upper rectification switch and a third lower rectification switch, and
a current balance controller, configured to receive a first current, a second current, and a third current, and calculate a first phase angle difference and a second phase angle difference according to peak values, average values, or root-mean-square values of the first current, the second current, and the third current,
wherein the first current is a current flowing from a command node between the first upper switch and the first lower switch to the three-phase transformer, the second current is a current flowing from a command node between the second upper switch and the second lower switch to the three-phase transformer, and the third current is a current flowing from a command node between the third upper switch and the third lower switch to the three-phase transformer, wherein the control unit maintains an output voltage of the resonant converter to be higher than a voltage threshold by configuring the first upper rectification switch to be turned on with a first phase angle leading to the first upper switch, the second upper rectification switch to be turned on with a second phase angle leading to the second upper switch, and the third upper rectification switch to be turned on with a third phase angle leading to the third upper switch; and configuring the first lower rectification switch to be turned on with the first phase angle leading to the first lower switch, the second lower rectification switch to be turned on with the second phase angle leading to the second lower switch, and the third lower rectification switch to be turned on with the third phase angle leading to the third lower switch; wherein the second phase angle is equal to the first phase angle plus the first phase angle difference, and the third phase angle is equal to the first phase angle plus the second phase angle difference.

2. The three-phase resonant converter as claimed in claim 1, wherein the control unit acquires a working frequency command according to the output voltage,
wherein based on the working frequency command being less than a frequency threshold of the resonant converter, the first upper rectification switch, the second upper rectification switch, and the third upper rectification switch are turned on, and the first lower rectification switch, the second lower rectification switch, and the third lower rectification switch are turned on, and
wherein a time period of turning on one of the first upper rectification switch, the second upper rectification switch, and the third upper rectification switch is longer than a period that is the reciprocal of the frequency threshold, and a time period of turning on one of the first lower rectification switch, the second lower rectification switch, and the third lower rectification switch is longer than a period that is the reciprocal of the frequency threshold.

3. The three-phase resonant converter as claimed in claim 2, wherein a time point of turning on one of the first upper rectification switch, the second upper rectification switch, and the third upper rectification switch is earlier than a time point of turning on one of the first upper switch, the second upper switch, and the third upper switch, and a time point of turning on one of the first lower rectification switch, the second lower rectification switch, and the third lower rectification switch is earlier than a time point of turning on one of the first lower switch, the second lower switch, and the third lower switch; a time point of turning off one of the first upper rectification switch, the second rectification switch, and the third rectification switch is earlier than a time point of turning off one of the first upper switch, the second upper switch, and the third upper switch, and a time point of turning off one of the first lower rectification switch, the second lower rectification switch, and the third lower rectification switch is earlier than a time point of turning off one of the first lower switch, the second lower switch, and the third lower switch; and the time period of turning on the upper rectification switches and turning on the lower rectification switches at different switching cycles gradually increases with time.

4. The three-phase resonant converter as claimed in claim 2, wherein the frequency threshold is a resonant frequency of the three-phase resonant converter.

5. The three-phase resonant converter as claimed in claim 1, wherein the control unit acquires a working frequency command according to the output voltage, wherein based on the working frequency command being greater than a frequency threshold of the resonant converter, the first upper rectification switch, the second upper rectification switch, and the third upper rectification switches are turned on, and the first lower rectification switch, the second lower rectification switch, and the third lower rectification switch is turned, wherein a time point of turning on one of the first upper rectification switch, the second upper rectification switch, and the third upper rectification switch is earlier than a time point of turning on one of the first upper switch, the second upper switch, and the third upper switch, and a time point of turning on one of the first lower rectification switch, the second lower rectification switch, and the third lower rectification switch is earlier than a time point of turning on one of the first lower switch, the second lower switch, and the third lower switch; a time period of turning on one of the first upper rectification switch, the second upper rectification switch, and the third upper rectification switch is equal to a time period of turning on one of the first upper switch, the second upper switch, and the third upper switch, and a time period of turning on the first lower rectification switch, the second lower rectification switch, and the third lower rectification switch is equal to a time period of turning on one of the first lower switch, the second lower switch, and the third lower switch.

6. The three-phase resonant converter as claimed in claim 1, wherein based on three input currents flowing into the three primary-side windings being the same, the first phase angle, the second phase angle, and the third phase angle are the same.

7. The three-phase resonant converter as claimed in claim 6, wherein the first phase angle difference and the second phase angle difference are zero.

8. The three-phase resonant converter as claimed in claim 1, wherein based on three input currents flowing into the three primary-side windings being not the same, the first phase angle, the second phase angle, and the third phase angle are not the same.

9. The three-phase resonant converter as claimed in claim 8, wherein the first phase angle difference and the second phase angle difference are not zero.

10. The three-phase resonant converter as claimed in claim 9, wherein the first phase angle difference is determined by the first current and the second current, and the second phase angle difference is determined by the first current and the third current;

wherein when the second current is greater than the first current, the first phase angle difference is negative, and when the second current is less than the first current, the first phase angle difference is positive; wherein as an absolute value of a current difference between the second current and the first current increases, an absolute value of the first phase angle difference increases;

wherein when the third current is greater than the first current, the second phase angle difference is negative, and when the third current is less than the first current, the second phase angle difference is positive; wherein as an absolute value of a current difference between the third current and the first current increases, an absolute value of the second phase angle difference increases.

11. The three-phase resonant converter as claimed in claim 1, wherein the three primary-side windings of the three-phase transformer are star-connected or delta-connected, and the three secondary-side windings of the three-phase transformer are star-connected or delta-connected.

12. A method of controlling a three-phase resonant converter, comprising steps of:

providing a three-phase resonant converter having a three-phase transformer, an input bridge arm assembly comprising a first input switch arm, a second input switch arm, and a third input switch arm, and an output bridge arm assembly comprising a first output synchronous rectification switch arm, a second output synchronous rectification switch arm, and a third output synchronous rectification switch arm; wherein the first input switch arm, the second input switch arm, and the third input switch arms respectively comprise a first upper switch and a first lower switch, a second upper switch and a second lower switch, and a third upper switch and a third lower switch; wherein the first output synchronous rectification switch arm, the second output synchronous rectification switch arm, and the third output synchronous rectification switch arms respectively comprise a first upper rectification switch and a first lower rectification switch, a second upper rectification switch and a second lower rectification switch, and a third upper rectification switch and a third lower rectification switch;

maintaining an output voltage of the resonant converter to be higher than a voltage threshold by configuring the first upper rectification switch to be turned on with a first phase angle leading to the first upper switch, the second upper rectification switch to be turned on with a second phase angle leading to the second upper switch, and the third upper rectification switch to be turned on with a third phase angle leading to the third upper switch; and configuring the first lower rectification switch to be turned on with the first phase angle leading to the first lower switch, the second lower rectification switch to be turned on with the second phase angle leading to the second lower switch, and the third lower rectification switch to be turned on with the third phase angle leading to the third lower switch; wherein the second phase angle is equal to the first phase angle plus the first phase angle difference, and the third phase angle is equal to the first phase angle plus the second phase angle difference; and receiving a first current, a second current, and a third current, and calculating a first phase angle difference and a second phase angle difference according to peak values, average values, or root-mean-square values of the first current, the second current, and the third current, wherein the first current flows from a node between the first upper switch and the first lower switch to the three-phase transformer, the second current flows from a node between the second upper switch and the second lower switch to the three-phase transformer, and the third current flows from a node between the third upper switch and the third lower switch to the three-phase transformer.

13. The method of controlling a three-phase resonant converter as claimed in claim 12, further comprising acquiring a working frequency command according to the output voltage, wherein based on the working frequency command being less than a frequency threshold of the resonant converter, the first upper rectification switch, the second upper rectification switch, and the third upper rectification switch are turned on, and the first lower rectification switch, the second lower rectification switch, and the third lower rectification switch are turned on, and wherein a time period of turning on one of the first upper rectification switch, the second upper rectification switch, and the third upper rectification switch is longer than a period that is the reciprocal of the frequency threshold, and a time period of turning on one of the first lower rectification switch, the second lower rectification switch, and the third lower rectification switch is longer than a period that is the reciprocal of the frequency threshold.

14. The method of controlling a three-phase resonant converter as claimed in claim 13, a time point of turning on one of the first upper rectification switch, the second upper rectification switch, and the third upper rectification switch is earlier than a time point of turning on one of the first upper switch, the second upper switch, and the third upper switch, and a time point of turning on one of the first lower rectification switch, the second lower rectification switch, and the third lower rectification switch is earlier than a time point of turning on one of the first lower switch, the second lower switch, and the third lower switch; and the time period of turning on the upper rectification switches and turning on the lower rectification switches at different switching cycles gradually increases with time.

15. The method of controlling a three-phase resonant converter as claimed in claim 12, further comprising acquiring a working frequency command according to the output voltage, wherein based on the working frequency command being greater than a frequency threshold of the resonant converter, a time point of turning on one of the first upper rectification switch, the second upper rectification switch, and the third upper rectification switch is earlier than a time point of turning on one of the first upper switch, the second upper switch, and the third upper switch, and turning on one of the first lower rectification switch, the second lower rectification switch, and the third lower rectification switch is earlier than a time point of turning on one of the first lower switch, the second lower switch, and the third lower switch; a time period of turning on one of the first upper rectification switch, the second upper rectification switch, and the third upper rectification switch is equal to a time period of turning on one of the first upper switch, the second upper switch, and the third upper switch, and a time period of turning on one of the first lower rectification switch, the second lower rectification switch, and the third lower rectification switch is equal to a time period of turning on one of the first lower switch, the second lower switch, and the third lower switch.

16. The method of controlling a three-phase resonant converter as claimed in claim 12, wherein based on three input currents flowing into the three primary-side windings of the three-phase transformer being not the same, the first phase angle, the second phase angle, and the third phase angle not the same.

17. The method of controlling a three-phase resonant converter as claimed in claim 16, wherein the first phase angle difference and the second phase angle difference are not zero.

18. The method of controlling a three-phase resonant converter as claimed in claim 17, wherein the first phase angle difference is determined by the first current and the second current, and the second phase angle difference is determined by the first current and the third current, wherein when the second current is greater than the first current, the first phase angle difference is negative, and when the second current is less than the first current, the first phase angle difference is positive; wherein as an absolute value of a current difference between the second current and the first current increases, an absolute value of the first phase angle difference increases, and wherein when the third current is greater than the first current, the second phase angle difference is negative, and when the third current is less than the first current, the second phase angle difference is positive; wherein as an absolute value of a current difference between the third current and the first current increases, an absolute value of the second phase angle difference increases.

* * * * *